United States Patent
Li et al.

(10) Patent No.: US 11,847,120 B2
(45) Date of Patent: Dec. 19, 2023

(54) PERFORMANCE OF SQL EXECUTION SEQUENCE IN PRODUCTION DATABASE INSTANCE

(71) Applicant: INTERNATIONAL BUSINESS MACHINES CORPORATION, Armonk, NY (US)

(72) Inventors: Shuo Li, Beijing (CN); Xiaobo Wang, Beijing (CN); Min Li, Beijing (CN); Sheng Yan Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 17/541,322

(22) Filed: Dec. 3, 2021

(65) Prior Publication Data
US 2023/0177052 A1 Jun. 8, 2023

(51) Int. Cl.
*G06F 16/30* (2019.01)
*G06F 16/2453* (2019.01)
*G06F 11/34* (2006.01)
*G06F 16/23* (2019.01)
*G06F 16/2452* (2019.01)

(52) U.S. Cl.
CPC .... *G06F 16/24545* (2019.01); *G06F 11/3409* (2013.01); *G06F 16/2358* (2019.01); *G06F 16/24524* (2019.01)

(58) Field of Classification Search
CPC ......... G06F 16/24545; G06F 16/24524; G06F 16/2358
See application file for complete search history.

(56) References Cited

U.S. PATENT DOCUMENTS 6,219,660 B1 * 4/2001 Haderle ............ G06F 16/24542
707/718
8,775,412 B2 7/2014 Day
(Continued)

FOREIGN PATENT DOCUMENTS

CN 107577603 A 1/2018

OTHER PUBLICATIONS

ISR, dated Jan. 16, 2023, International application No. PCT/CN2022/131719, International filing date Nov. 14, 2022, 9 pages.
(Continued)

*Primary Examiner* — Khanh B Pham
(74) *Attorney, Agent, or Firm* — Schmeiser, Olsen & Watts, LLP; Stephanie Carusillo

(57) ABSTRACT

A method, computer program product, and computer system for improving performance of a SQL execution sequence of SQL statements. The SQL execution sequence is recorded in an event log. Original results of executing the SQL statements and an original CPU cost of executing the SQL statements in accordance with the original access path are recorded in a logical log. A new access path is generated from analysis of the event log and the logical log. The SQL statements are executed in accordance with the new access path resulting in new results of executing the SQL statements including a new CPU cost of executing the SQL statements in accordance with the new access path. In response to a determination that the new results replicate the original results and that the new CPU cost is less than the original CPU cost, the original access path is replaced with the new access path.

20 Claims, 14 Drawing Sheets

(56) References Cited

U.S. PATENT DOCUMENTS

| | | | |
|---|---|---|---|
| 10,366,096 B2* | 7/2019 | Ferrar | G06F 11/3072 |
| 10,949,197 B1 | 3/2021 | Wang | |
| 2003/0167272 A1* | 9/2003 | Sinnott, Jr. | G06F 16/24544 |
| 2007/0050330 A1 | 3/2007 | Karn | |
| 2016/0292263 A1* | 10/2016 | Ferrar | G06F 40/16 |
| 2017/0017686 A1* | 1/2017 | Feng | G06F 16/24534 |
| 2017/0116275 A1* | 4/2017 | Baggett | G06F 16/24549 |
| 2018/0239677 A1 | 8/2018 | Chen | |
| 2019/0243827 A1* | 8/2019 | Ferrar | G06N 20/00 |
| 2019/0354621 A1 | 11/2019 | Wang | |
| 2021/0240713 A1* | 8/2021 | Kondiles | G06F 16/2456 |
| 2022/0019587 A1* | 1/2022 | Chen | G06F 16/24549 |

OTHER PUBLICATIONS

Mell, Peter et al.; "The NIST Definition of Cloud Computing;" National Institute of Standards and Technology; Special Publication 800-145; Sep. 2011; 7 pages.

ip.com, A semantic based method and system to perform SQL access path comparison, Original Publication Date: Jul. 23, 2009, IP.com No. IPCOM000185382D, https://priorart.ip.com/IPCOM/000185382, 5 pages.

Darcy G. Benoit, Automatic Diagnosis of Performance Problems in Database Management Systems, Proceedings of the Second International Conference on Autonomic Computing (ICAC'05) 0-7695-2276-9/05, Published Date: Sep. 6, 2005, https://ieeexplore.ieee.org/document/1498081, Computer Society, 2 pages.

White Paper Series, Sep. 2018, Oracle Autonomous Database, https://www.oracle.com/us/products/database/autonomous-database-self-repairing-5116047.pdf, 13 pages.

Oracle, Database 2 Day DBA, Performance Self-Diagnostics: Automatic Database Diagnostic Monitor, Copyright 2004, 2017, Oracle and/or its affiliates, https://docs.oracle.com/database/121/ADMQS/GUID-4451EB5B-165F-4333-8941-489E5E5B3ECE.htm#ADMQS1012, 3 pages.

Brien Posey, Software patch/fix, 4 pages, retrieved on Jun. 28, 2023 from the Internet: <URL: https://www.techtarget.com/searchenterprisedesktop/definition/patch>.

* cited by examiner

PERFORMANCE OF SQL EXECUTION SEQUENCE IN PRODUCTION DATABASE INSTANCE

BACKGROUND

The present invention relates in general to Structured Query Language (SQL) executable statements, and in particular to improving performance of a SQL execution sequence of SQL statements in a production database instance.

Database operations using SQL execution sequences may encounter errors and/or performance issues which need to be corrected.

SUMMARY

Embodiments of the present invention provide a method, a computer program product and a computer system, for improving performance of a Structured Query Language (SQL) execution sequence of SQL statements in a production database instance.

One or more processors of a computer system record the SQL execution sequence in an event log.

The one or more processors record, in a logical log in the production database instance, original results of executing the SQL statements in accordance with an original access path and an original Central Processing Unit (CPU) cost of executing the SQL statements in accordance with the original access path.

The one or more processors generate a modified database instance by applying a patch to the SQL execution sequence, wherein said generating the modified database instance includes generating a new access path from analysis of the event log and the logical log.

The one or more processors execute the SQL statements in accordance with the new access path resulting in new results of executing the SQL statements in accordance with the new access path.

The one or more processors determine a new CPU cost of executing the SQL statements in accordance with the new access path.

In response to a determination that the new results replicate the original results and that the new CPU cost is less than the original CPU cost, the one or more processors replace the original access path with the new access path in the production database instance for use in subsequent executions of the SQL statements.

The event log and the logical log are stored in a data storage cluster of the computer system.

DETAILED DESCRIPTION

Figure 1:
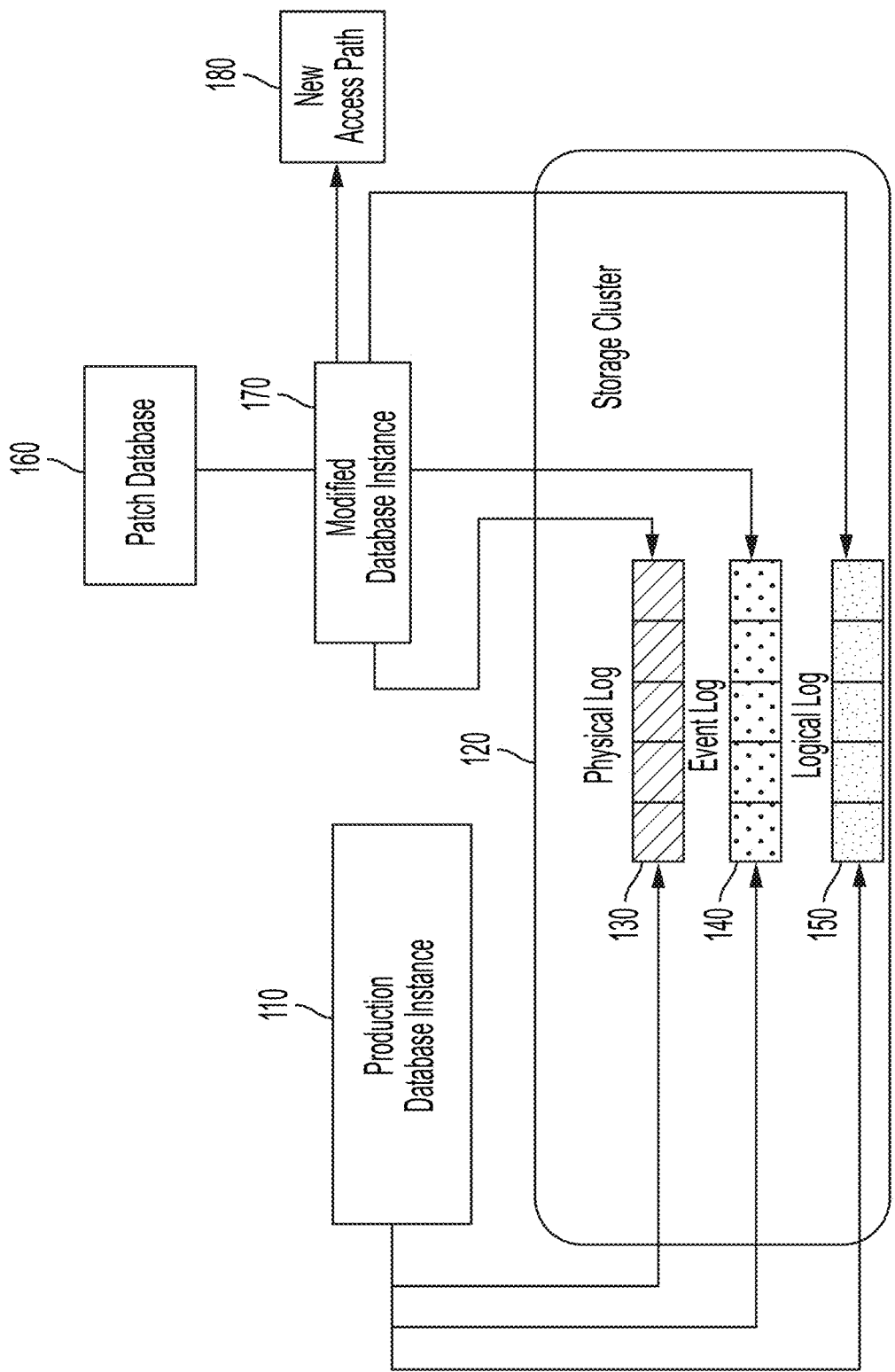
FIG. 1 depicts a production database instance comprising a Structured Query Language (SQL) execution sequence of SQL statements, in accordance with embodiments of the present invention

FIG. 1 depicts a production database instance 110 comprising a Structured Query Language (SQL) execution sequence of SQL statements, in accordance with embodiments of the present invention.

A computer system (see FIG. 12) comprises a production database node which includes the production database instance 110.

The SQL execution sequence is a time ordered sequence of Unit Recovery (UR) lists. Each UR list includes one or more SQL statements followed by a SQL Commit statement. Each UR list is assigned a unique identifier (ID) and a timestamp denoting a time at which the UR is generated. A UR list is "active" with respect to a SQL Select statement from a time of the timestamp of the SQL Select statement until a time at which the Commit in the UR list is executed.

In one embodiment, the SQL statements in a UR list may include operations that add, delete or update data content in rows of a database via SQL statements such as, inter alia, Insert, Delete and Update, respectively.

In one embodiment, the SQL statements in a UR list may include operations that retrieve data content in rows of a database via SQL statements such as, inter alia, a SQL Select statement.

A SQL statement operation is typically expressed, in practice, in an uppercase format, so that SQL Insert, Delete, Update, and Select statements are typically expressed, in practice, as INSERT, DELETE, UPDATE, and SELECT, respectively.

Figure 4:
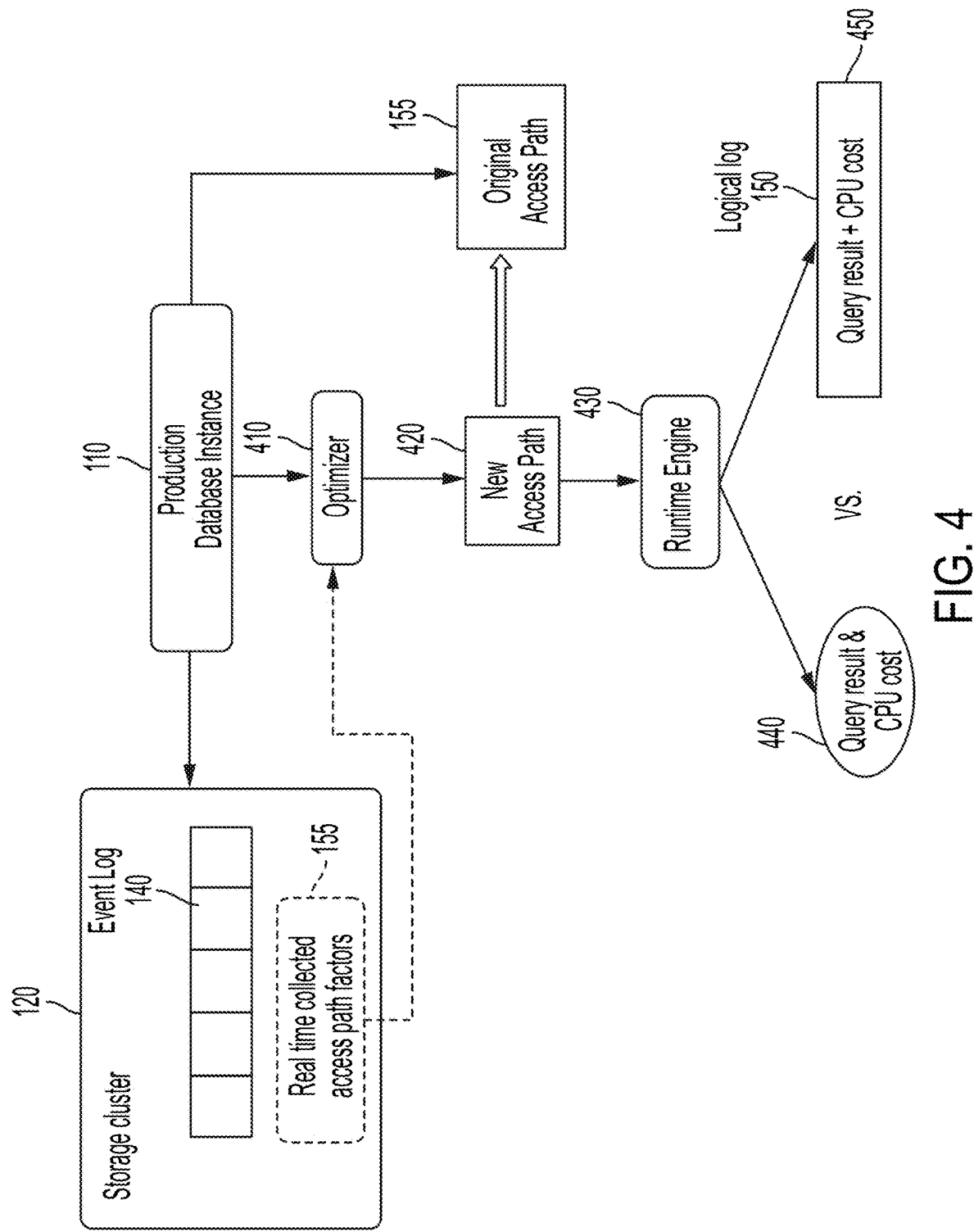
FIG. 4 depicts generation of a new access path and execution of SQL statements in a Unit Recovery (UR) using the new access path, in accordance with embodiments of the present invention.

A storage cluster 120 includes a physical log 130, an event log 140 a logical log 150, and real time collected access path factors (not shown if FIG. 1 but shown in FIG. 4).

The storage cluster 120 is hardware data storage within a computer system.

The physical log 130 records a redo/undo status of the operations in the UR lists.

The event log 140 records SQL execution sequence.

The logical log 150 records results of execution of the SQL statements in the URs of the SQL execution sequence and also records a Central Processing Unit (CPU) cost of executing the SQL statements. In one embodiment, the CPU cost is a total number of executed SQL statements in the SQL execution sequence (i.e., in the UR lists). In one embodiment, the CPU cost is CPU execution time for executing the SQL statements in the SQL execution sequence (i.e., in the UR lists).

An access path is an access/retrieve algorithm used to modify rows rows (e.g., SQL Insert, Delete, Update) and/or retrieve data from rows (e.g., a SQL Select statement) of tables in a database. The access/retrieve algorithm uses various access path factors to retrieve the data from the rows. The access path factors pertain to an original access path associated with the UR lists stored in the event log 140.

A patch from a patch database 160 is applied to the SQL execution sequence of the production database instance 110 to generate a modified database instance 170 which includes generation of a new access path 180 that replaces an original access path (not shown in FIG. 1) used for the SQL execution sequence in the production database instance 110.

The SQL sequence in the modified database instance 170 is executed with the new access path 180 and the result of the execution is compared for correctness and CPU cost with the SQL execution sequence stored in the event log 140 and the CPU cost stored in the logical log 150.

Figure 2:
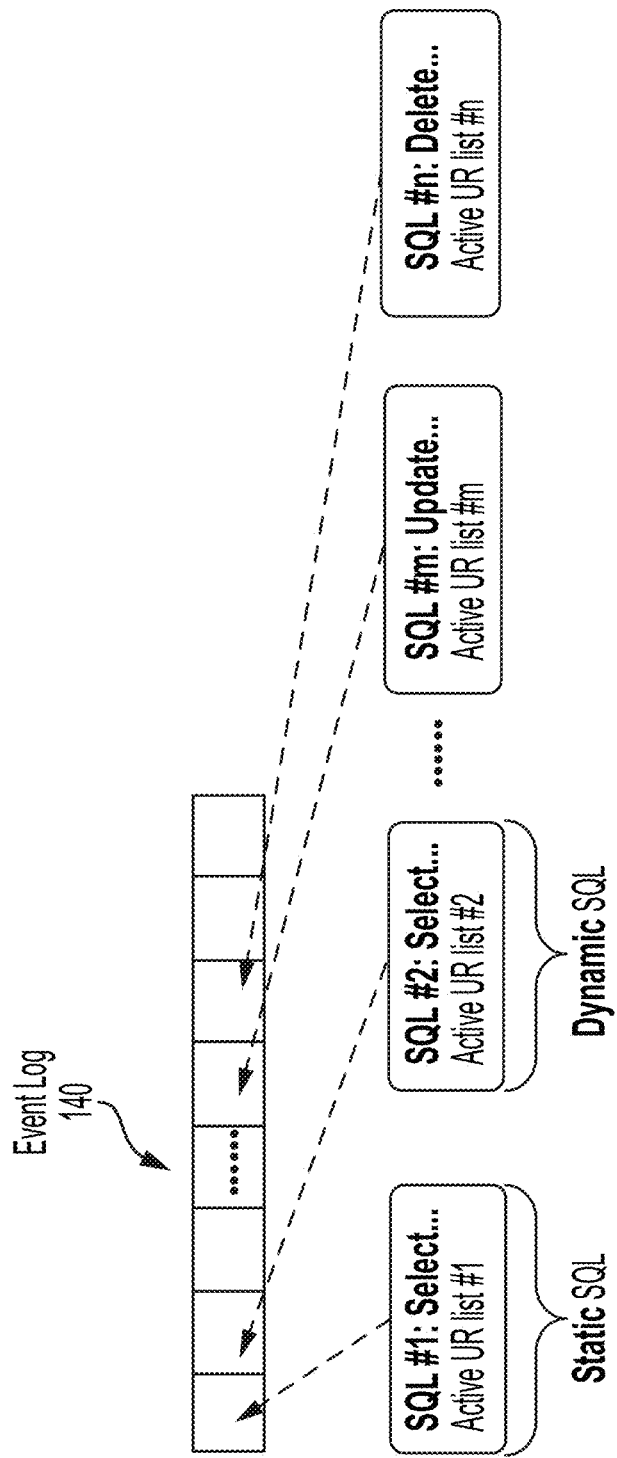
FIG. 2 depicts an event log, in accordance with embodiments of the present invention.

FIG. 2 depicts the event log 140, in accordance with embodiments of the present invention.

In one embodiment, the event log 140 includes Active UR list #1 (Select), Active UR list #2 (Select), . . . Active UR list #m (Update), . . . Active UR list #n (Delete).

Figure 3:
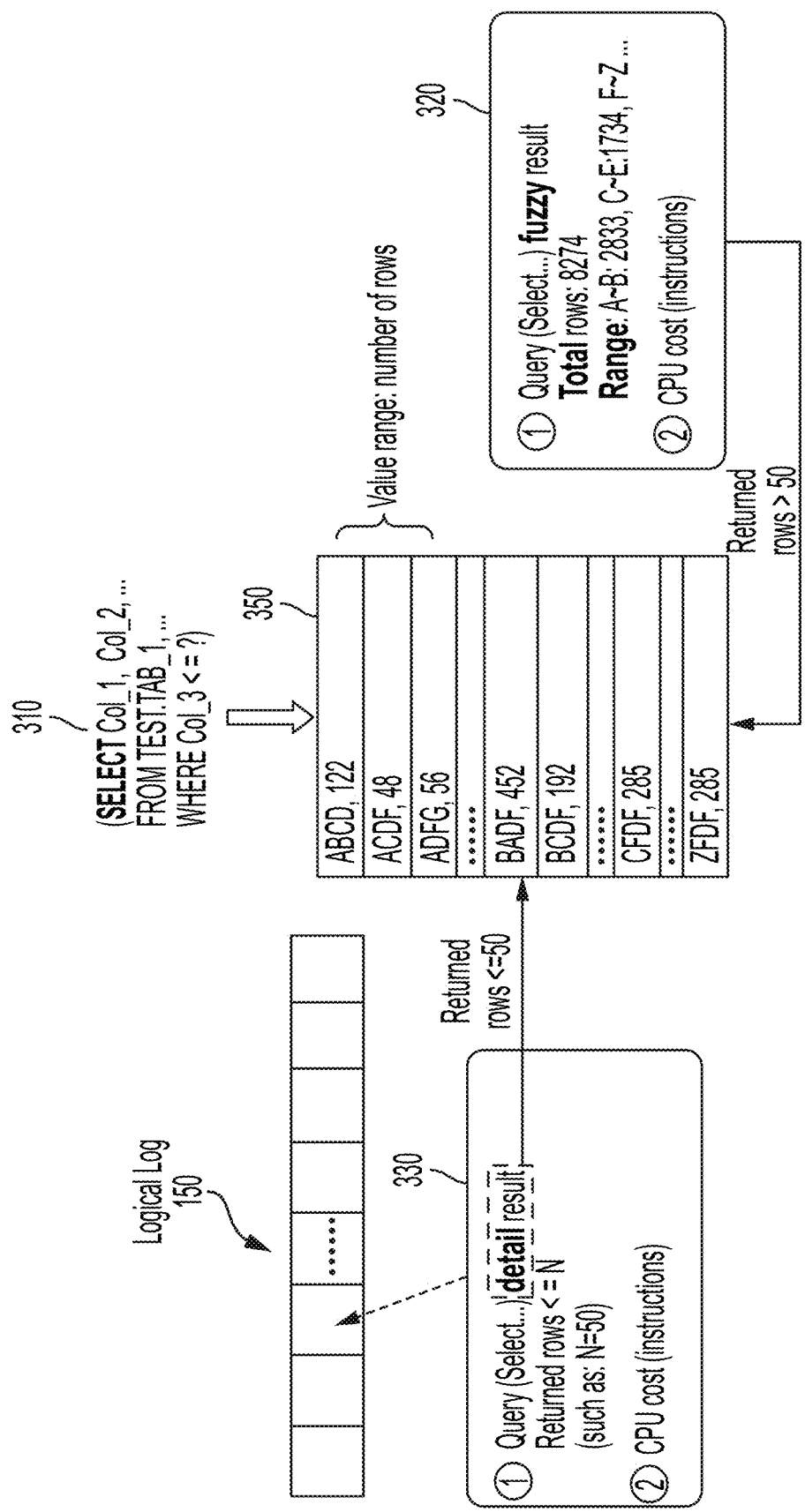
FIG. 3 depicts a logical log for a SQL Select query, in accordance with embodiments of the present invention.

FIG. 3 depicts the logical log 150 for a SQL Select query 310, in accordance with embodiments of the present invention. FIG. 3 also depicts returned data 350 resulting from execution of the Select query 310.

In one embodiment, a fuzzy search is conducted and a fuzzy returned data result 320 from execution of the Select query 310 is shown with 8274 rows being returned along with an associated CPU cost. A fuzzy search is a search based on search criteria and returning fuzzy search results in which the search criteria are satisfied only approximately, so that a much larger number of results are returned by a fuzzy search than by a normal search in which the search criteria are satisfied precisely. Detailed results are returned by a normal search.

In one embodiment, the fuzzy search returns search results comprise words that are spelled similarly but differently from corresponding words in the search criteria.

In one embodiment, the fuzzy search returns search results comprise words that are synonyms of words appearing in the search criteria.

In one embodiment, the fuzzy search returns search results via one or more of the following functions: Levenshtein distance, trigrams, and double metaphones.

In one embodiment, a normal search is conducted, and a detailed data result 330 is returned from execution of the Select query 310. The detailed data result 330 includes less than or equal to 50 rows along with an associated CPU cost.

FIG. 4 depicts generation of a new access path 420 and execution of the SQL statements in the UR using the new access path 420, in accordance with embodiments of the present invention.

The production database instance 110 reads the UR lists from the event log 140 in the storage cluster 120 and passes the UR lists to an optimizer 410.

The optimizer 410 receives the UR lists from the production database instance 110 and also reads real time collected access path factors from the storage cluster 120. The real time collected access path factors pertain to the original access path 155.

The optimizer 410 generates a new access path 420. The new access path 420 differs from the original access path 155.

The new access path 420 is generated based on analysis of the real time collected access path factors.

In one embodiment, the access path factors may be determined from analysis of SQL query blocks pertaining to a SQL Select statement which are represented by a SELECT list, a FROM list, and a WHERE tree, containing, respectively the list of items to be retrieved. For each query block, the relations in the FROM list are processed.

For example, consider the following SQL Select statement: "SELECT Col_1, Col_2, . . . FROM TEST. TAB_1, . . . WHERE Col_3<=10 AND Col_4='XY'. In determining a new access path, the optimizer 410 may examine the WHERE clause and the FROM clause of the Select statement and then determine a new execution path that is accurate and/or has a lower CPU cost of execution than using the original access paths for executing the Select statement.

A runtime engine 430 of the computer system executes the SQL statements in the UR lists using the new access path, which produces a new output 440 based on the new access path 420. The new output 440 comprises a query result and associated CPU cost. The query result in the new output 440 is compared for correctness with a query result in an original output 450 in the logical log 150, and the CPU cost in the new output 440 based on the new access path 420 is compared with the CPU cost in the original output 450 based on the original access path 155.

If the query result in the new output 440 is correct and the CPU cost in the new output 440 is less the CPU cost in the original output 450, then the new access path 420 replaces the original access path 155 in the production database instance 110 for use in subsequent executions of the SQL statements.

If the query result in the new output 440 is incorrect, as determined from the query result in the new output 440 not replicating the query result in the original output 450, then in one embodiment, a temporary workaround using the new access path 420 correctly may be used until a patch is obtained from the patch database 160 to fix the new access path 420.

Figure 5:
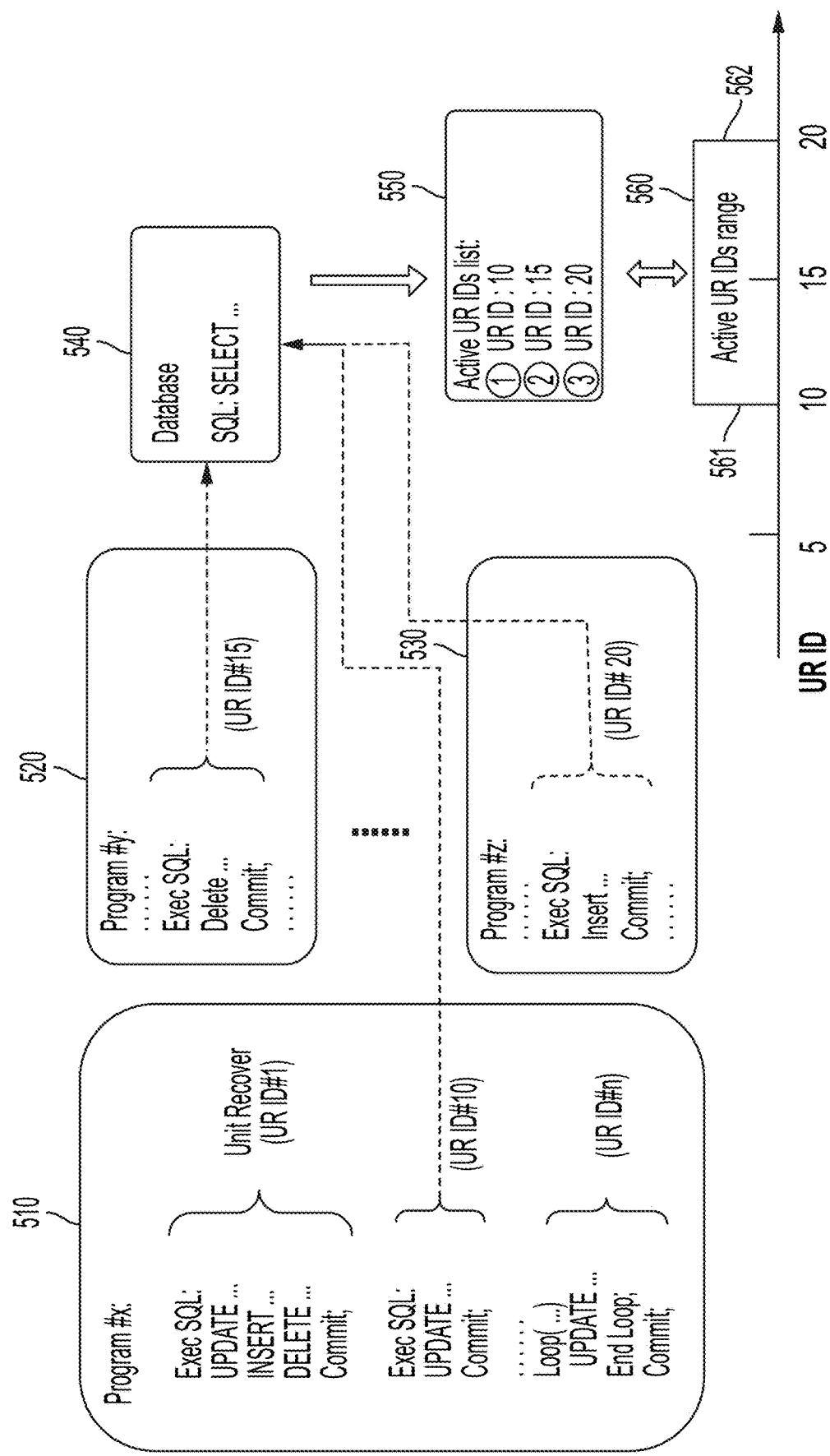
FIG. 5 depicts illustrative UR lists, in accordance with embodiments of the present invention.

FIG. 5 depicts illustrative UR lists, in accordance with embodiments of the present invention.

Program #X 510 includes UR lists #1, #10, . . . , #n. Program #Y 520 includes UR list #15. Program #Z 530 includes UR list #20. The preceding UR lists in the Programs #X, #Y and #Z are accessed from a database 540 and then executed via a SQL Select statement. The active UR lists 550 in the preceding UR lists in the Programs #X, #Y and #Z are determined based on a range 560 of active UR IDs, where the range 560 of active UR lists is UR lists encompassing a left boundary 561 (corresponding to UR list 10) and a right boundary 562 (corresponding to UR list 20).

All UR IDs less than or equal to the right boundary 562 (i.e., <20) have a timestamp not later than the timestamp of the SQL Select statement. All UR's greater than the right boundary 562 (i.e., >20) have a timestamp later than the timestamp of the SQL Select statement.

All UR lists greater than or equal to the left boundary 561 (i.e., >10) have not had their Commit executed. All UR lists less than the left boundary 561 (i.e., <10) have had their Commit executed.

In summary, (i) all UR lists above the range 560 of active UR lists (i.e., UR lists greater than 20) have a timestamp later than the timestamp of the SQL Select statement; (ii) all UR lists in the range 560 of active UR lists (i.e., UR lists 10 to 20) have a timestamp not later than the timestamp of the SQL Select statement and have not had their Commit executed; and (iii) all UR lists below the range 560 of active UR lists (i.e., UR lists 1 to 9) have a timestamp not later than the timestamp of the SQL Select statement and have had their Commit executed.

Figure 6:
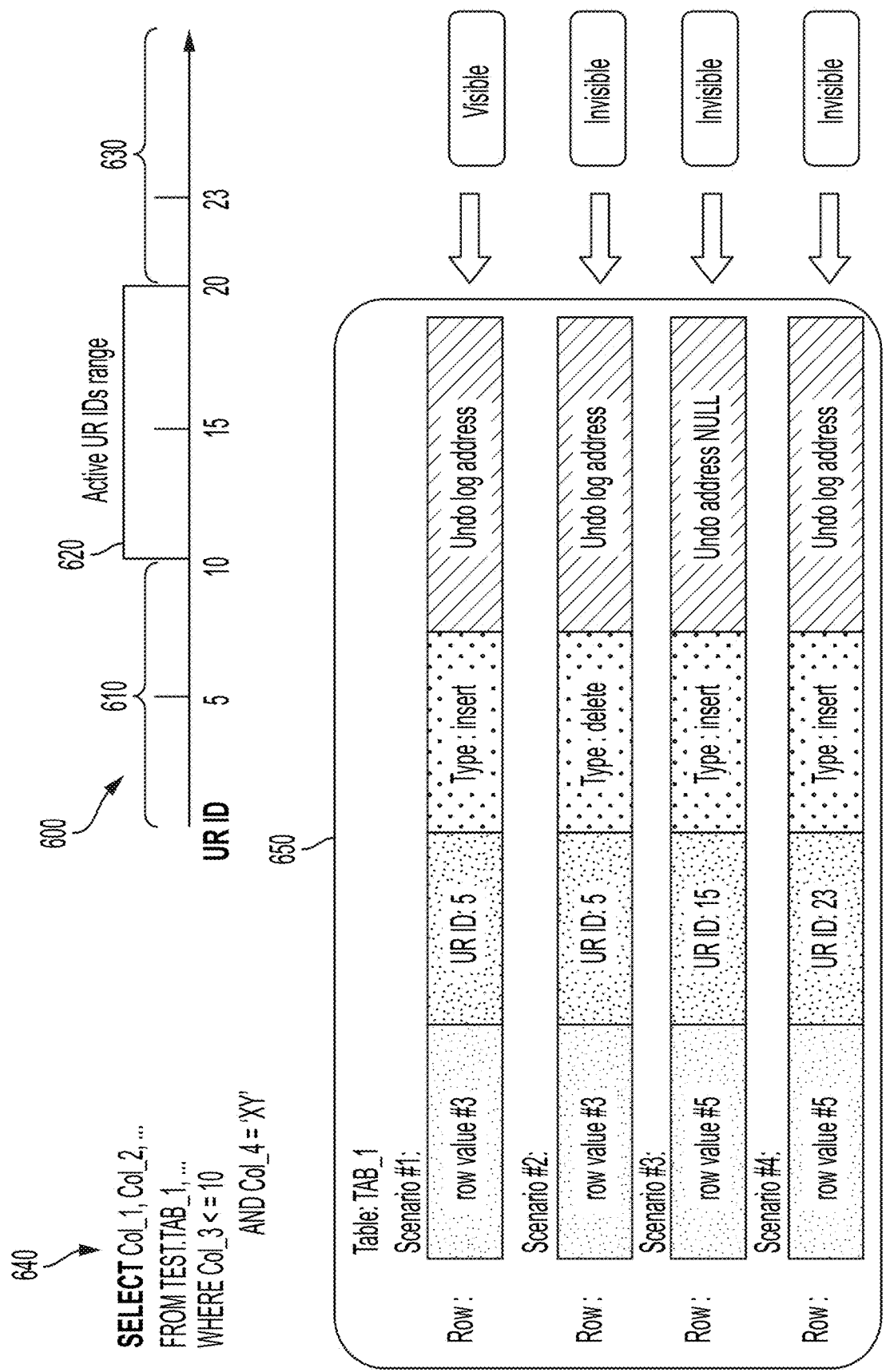
FIG. 6 depicts illustrative examples of determining whether data in rows of a table in a database is visible or invisible to a SQL Select statement configured to access the data, in scenarios in which the data in the row has been modified by a SQL row modification statement in a UR list, in accordance with embodiments of the present invention.

FIG. 6 depicts illustrative examples of determining whether data in rows of a table in a database is visible or invisible to a SQL Select statement 540 configured to access the data in scenarios in which the data in the row has been modified by a SQL row modification statement in a UR list, in accordance with embodiments of the present invention. In one embodiment, the SQL row modification statement is a SQL Insert, Delete or Update statement.

Data in a row of a table is visible to the SQL Select statement configured to access the data if the data can be accessed by the SQL Select statement; i.e., in one embodiment, if the timestamp of the SQL row modification statement (Insert or Update in this embodiment) is not later than the timestamp of the SQL Select statement and a Commit has been executed for the SQL row modification statement, which can be determined based on the position of the UR list in the list 600 of UR identifiers (IDs).

The list 600 of UR IDs includes a first UR ID range 610, a second UR ID range 620, and a third UR ID range 630.

The UR IDs are ordered in a timestamp sequence. Thus, UR ID 2 was assigned a timestamp after UR UD 1 was assigned a timestamp, UR ID 3 was assigned a timestamp after UR UD 2 was assigned a timestamp, etc.

The second UR ID range 620 encompasses a range (10 to 20) of active UR IDs.

The first UR ID range 610 encompasses a range (1 to 9) of UR IDs below the UR IDs in the second UR ID range 620. Thus, a Commit has been executed for each UR in the first UR ID range 610.

The third ID range 630 encompasses a range (11 to 23 to . . . ) of UR IDs above the UR IDs in the second UR ID range 620. Thus, the timestamp of the UR in the third range 630 is later than the timestamp of the SQL statement.

Table TAB_1 650 describes a visible/invisible status of rows in a table modified by a SQL row modification statement (Insert, Delete, Update) in a specified UR ID in the event log 140. Each row in Table TAB_1 includes an Undo log address pointing to address of a UR having an earlier timestamp.

An Undo log records changes of data in the URs and may be used to cancel incomplete transactions by rolling back previous operations (e.g., when an error occurs).

In scenario #1, a SQL Insert statement in UR ID 5 inserts data in row 3 of the table. The inserted data is visible to the SQL Select statement 640, because UR ID 5 is in the first ID range 610 for which a Commit has been executed. The Commit commits the insertion of the data which is now visible. The Undo log address points to the address of an earlier UR (i.e., the UR in scenario #1 has a timestamp that is later than the timestamp of the earlier UR).

In scenario #2, a SQL Delete statement in UR ID 5 deletes data from row 3 of the table. The deleted data is invisible to the SQL Select statement 640, because UR ID 5 is in the first ID range 610 for which a Commit has been executed. The Commit commits the deletion of the data which is now invisible. The Undo log address points to the address of an earlier UR.

In scenario #3, a SQL Insert statement in UR ID 15 inserts data in row 5 of the table. The inserted data is invisible to the SQL Select statement 640, because UR ID 15 is in the second ID range 620 for which a Commit has not yet been executed. The Commit is necessary for the data to be visible. The Undo log address of NULL means that an address of an earlier UR does not exist (e.g., if there is no earlier UR).

In scenario #4, a SQL Insert statement in UR ID 23 inserts data in row 5 of the table. The inserted data is invisible to the SQL Select statement 640, because UR ID 23 is in the third ID range 630 for which a timestamp of UR ID 23 later than a timestamp of the SQL Select statement. The Undo log address points to the address of an earlier UR.

There are multiple benefits in determining whether data referenced by a SQL statement in a UR is visible or invisible to the SQL Select statement 640 including: (i) determining whether execution of the SQL Select statement 640 will produce a correct result, since invisible data cannot be accessed by the SQL Select statement; and (ii) making a more effective choice by the optimizer 410 (see FIG. 4) for generating a new access path, since all data to be accessed in an access path should be visible.

Figure 7:
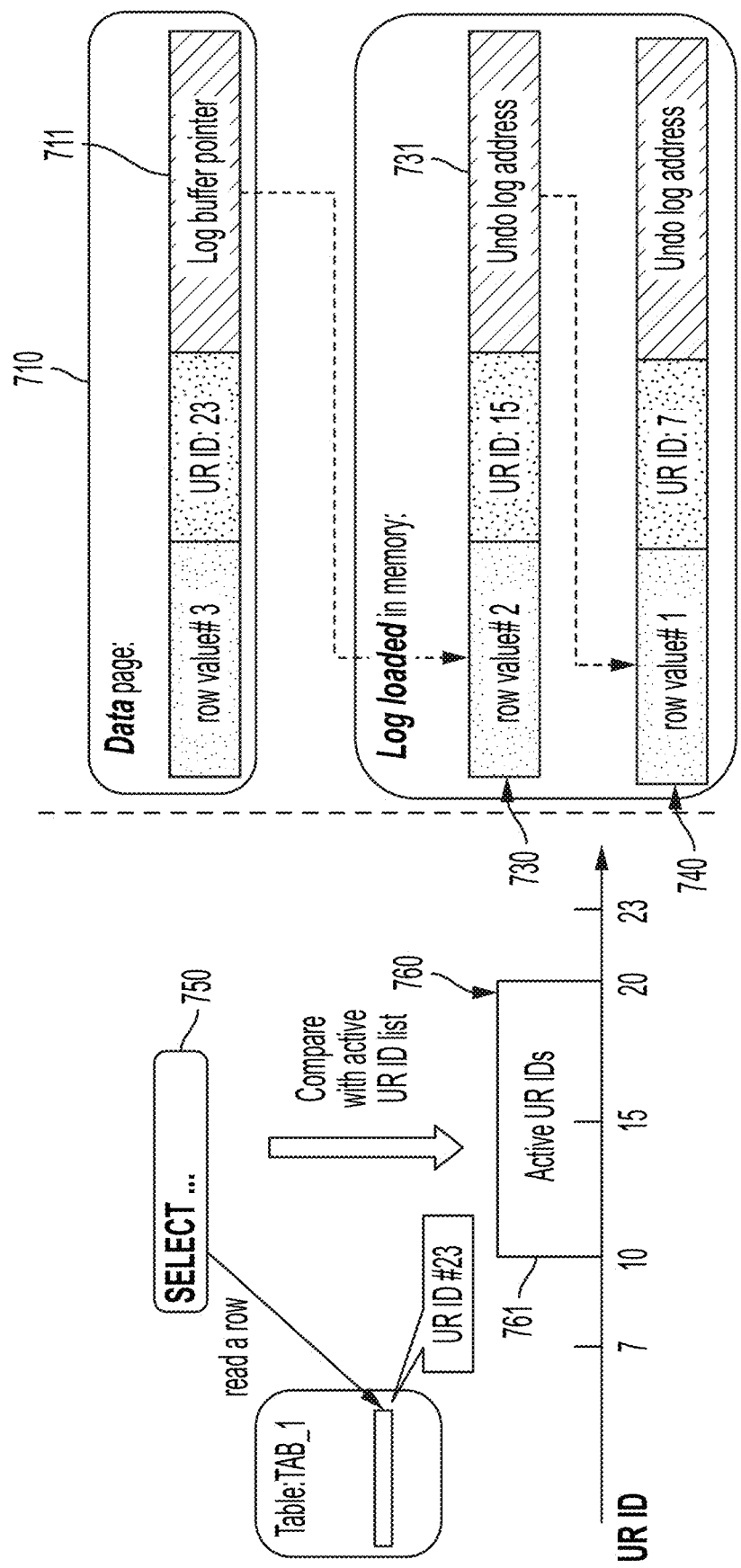
FIG. 7 illustrates tracing of Undo logs to discover and utilize a chain of changes to a database, in accordance with embodiments of the present invention.

FIG. 7 illustrates tracing of Undo logs to discover and utilize a chain of changes to a database, in accordance with embodiments of the present invention. The changes in the chain of changes are to a same portion of the database (e.g., changes to a same column of the database).

A tablespace is storage location containing, inter alia, database objects including addresses of tables and can be used to organize data in the database into logical storage groups related to where data is stored. A tablespace may include a data page 710.

In one embodiment, the data page 710 identifies a change made by UR 23 in a column of row 3 of a table. The data page 710 includes a log buffer pointer 711 pointing to a data record 730 of UR 15 that made a last previous change in the same column in row 2 of the table. The data record 730 is derived from the event log and includes a log buffer pointer 731 pointing to a data record 740 of UR 7 that made a last previous change in the same column in row 1 of the table. The data record 740 is derived from the event log and identifies the current data in row 1 of the column if the current data in row 1 is visible to SQL Select statement 750 as determined by the Active UR IDs 760 relative to the SQL Selected statement 750.

The preceding log address chain (710 to 730 and 731 to 740) can be used to trace back Undo records in the UR lists in accordance with a chain of Undo log addresses in respective UR lists of a plurality of time-ordered UR lists for respective changes to a column of a table, until a UR identifier (ID) of one of the respective UR lists is less than a lower boundary of active UR identifiers. After the Undo records have been fully traced back, visibility of the changes to the column of the table may be determined based on a timestamp of the current SQL Select statement 750.

The preceding log address chain (710 to 730 and 731 to 740) can also be used to find the last value in the column for which a Commit was executed (in UR 7) before the current time step.

The preceding log address chain in conjunction with the Active UR IDs 760 implies: if the SQL Select statement 750 occurs at a time after the timestamp of UR 23, then the SQL Select statement 750 can be used to read the most current value in the column (in UR 23) when a Commit is executed for UR 23.

Generally, the preceding log address chain identifies visible and/or invisible changes, and which URs made the changes, to the column of the table.

The preceding analysis of FIG. 7 describes the Undo records being traced back according to the chain of Undo log addresses until the UR ID is less than the lower boundary 761 of the active UR IDs 760, after which visibility of the changes to the column can be determined based on the timestamp of the current SQL Select statement 750.

Figure 8:
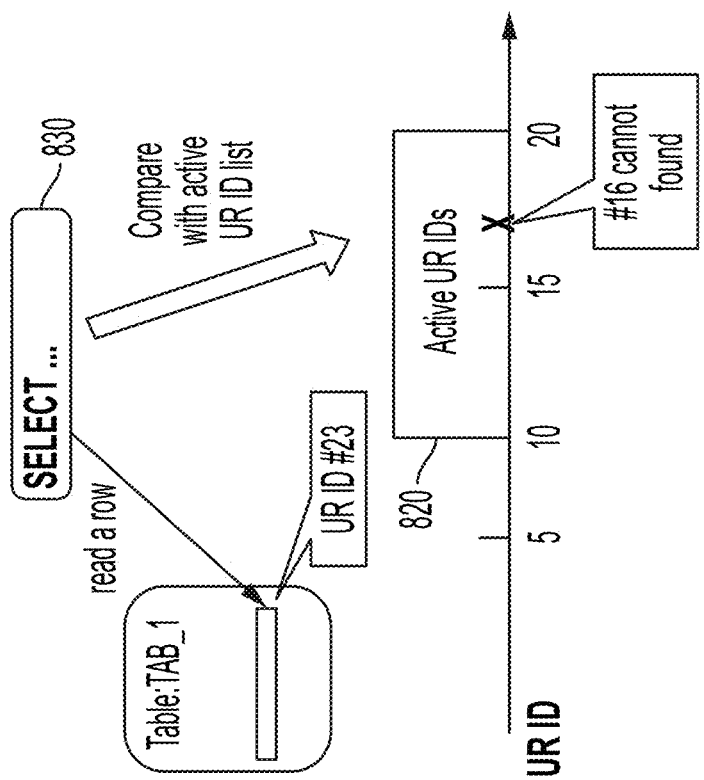
FIG. 8 illustrates a scenario of a UR ID being within the range of UR IDs of an active UR ID list but cannot be found within the range, in accordance with embodiments of the present invention.

FIG. 8 illustrates a scenario of a UR ID 16 being within the range of UR IDs of the active UR ID list 820 but cannot be found within the range 820, in accordance with embodiments of the present invention. The UR ID 16 changes a current row.

The preceding scenario indicates that the current row has been committed prior to generation of the UR IDs and is still visible to a current read operation by SQL Select statement 830.

Figure 9:
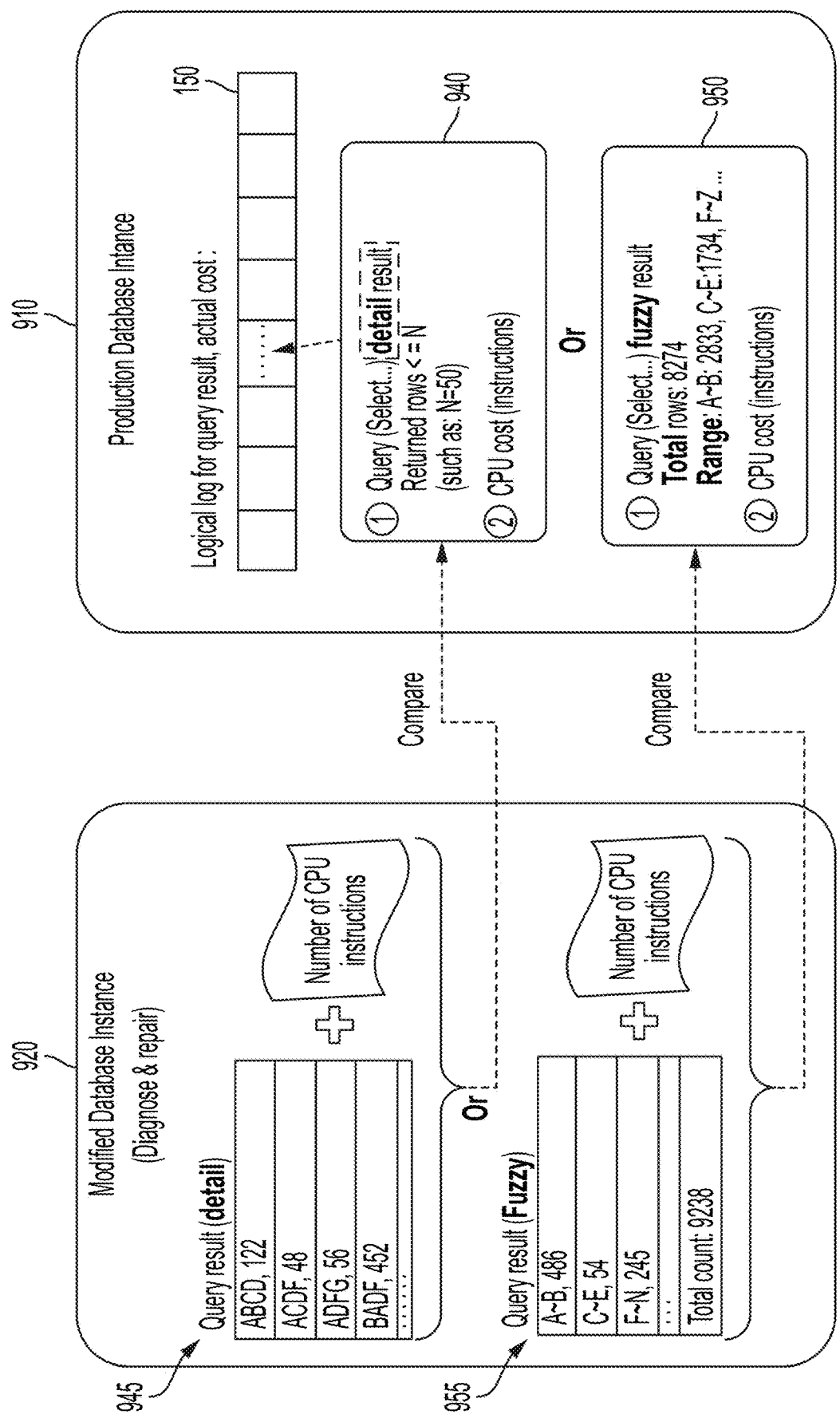
FIG. 9 illustrates a comparison in correctness and CPU cost for executing a SQL execution sequence for a production database instance using an original access path and for executing the SQL execution sequence for a modified database instance using a new access path, in accordance with embodiments of the present invention.

FIG. 9 illustrates a comparison in correctness and CPU cost between a SQL execution sequence for a production database instance 910 using an original access path and a modified database instance 920 using a new access path, in accordance with embodiments of the present invention.

The SQL execution sequence for the modified 910 is obtained from the event log 140 (see FIG. 1). The result of performing the SQL execution sequence for the production database instance 910 is obtained from the logical log 150.

The results of performing the SQL execution sequence includes SQL execution correctness and CPU cost.

The SQL execution sequence is performed for both detailed (i.e., normal) queries within the SQL execution sequence and fuzzy queries within the SQL execution sequence.

The result of performing the SQL execution sequence with detailed queries for the production database instance 910 is depicted as search results 940.

The result of performing the SQL execution sequence with detailed queries for the modified database instance 920 is depicted as search results 945.

The result of performing the SQL execution sequence with fuzzy queries for the production database instance 910 is depicted as search results 950.

The result of performing the SQL execution sequence with fuzzy queries for the modified database instance 920 is depicted as search results 955.

Figure 10:
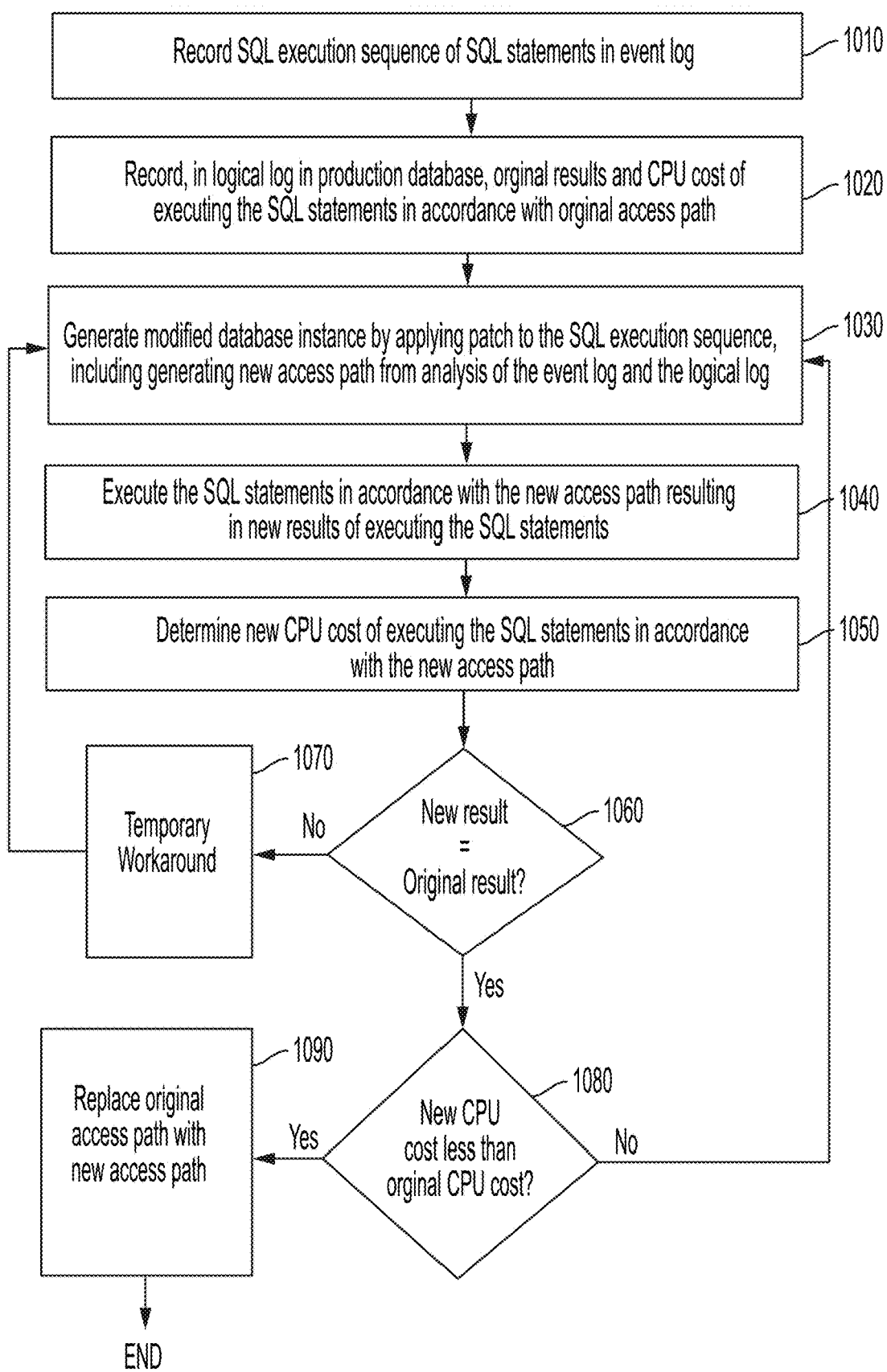
FIG. 10 is a flow chart describing a method for improving performance of a SQL execution sequence of SQL statements in a production database instance, in accordance with embodiments of the present invention.

FIG. 10 is a flow chart describing a method for improving performance of a SQL execution sequence of SQL statements in a production database instance, in accordance with embodiments of the present invention. The flow chart of FIG. 10 includes steps 1010-1090.

Step 1010 records the SQL execution sequence in an event log.

Step 1020 records, in a logical log in the production database instance in the event log, original results of executing the SQL statements in accordance with an original access path and an original Central Processing Unit (CPU) cost of executing the SQL statements in accordance with the original access path.

Step 1030 generates a modified database instance by applying a patch to the SQL execution sequence, wherein generating the modified database instance includes generating a new access path from analysis of the event log and the logical log.

Step 1040 executes the SQL statements in accordance with the new access path resulting in new results of executing the SQL statements in accordance with the new access path.

Step 1050 determines the SQL statements in accordance with the new access path resulting in new results of executing the SQL statements in accordance with the new access path.

Step 1060 determines whether the new results of executing the SQL statements in accordance with the new access path is equal to (i.e., replicates) the original results of executing the SQL statements in accordance with the original access path.

If step 1060 determines that the new results of executing the SQL statements in accordance with the new access path does not replicate the original results of executing the SQL statements in accordance with the original access path, then step 1070 is next executed.

In step 1070, a temporary workaround using the new access path correctly is used until a new patch is obtained from the patch database in step 1030 to fix the new access path, after which steps 1040, 1050, and 1060 are again executed.

If step 1060 determines that the new results of executing the SQL statements in accordance with the new access path replicates the original results of executing the SQL statements in accordance with the original access path, then step 1080 is next executed.

Step 1080 determines whether the new CPU cost is less than the original CPU cost.

If step 1080 determines that the new CPU cost is not less than the original CPU cost, then step 1030 obtains a new patch from the patch database in an attempt to reduce the new CPU cost, after which steps 1040, 1050, and 1060 are again executed.

If step 1080 determines that the new CPU cost is less than the original CPU cost, then in step 1090, the new access path replaces the original access path in the production database instance, which ends the method.

Figure 11:
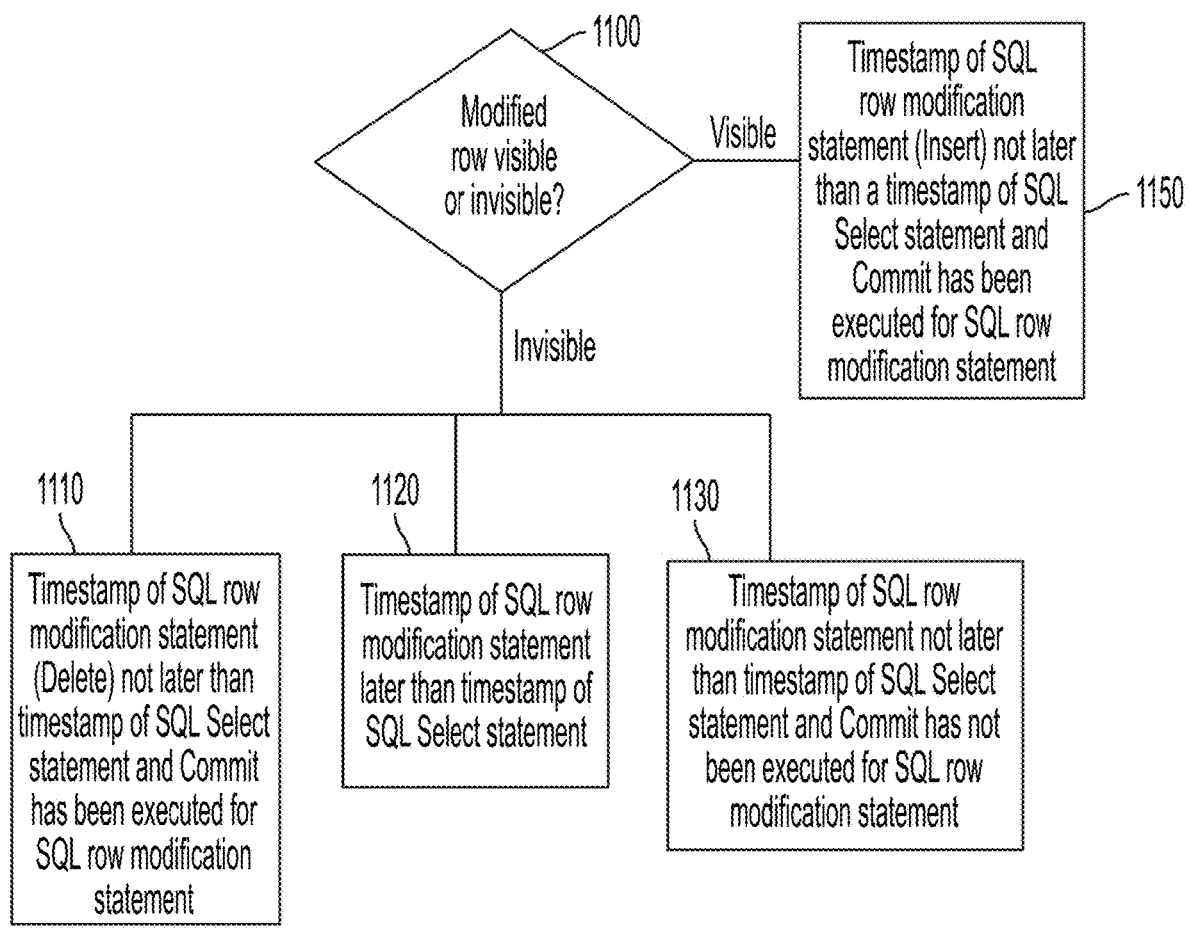
FIG. 11 depicts condition that determines whether data in a row modified by a SQL row modification statement is visible or invisible to a SQL Select statement, in accordance with embodiments of the present invention.

FIG. 11 depicts conditions that determines whether data in a row modified by a SQL row modification statement is visible or invisible to a SQL Select statement, in accordance with embodiments of the present invention. One or more SQL statements in one UR list of the UR lists include the SQL row modification statement. In one embodiment, the SQL row modification statement is a SQL Insert statement, a SQL Delete statement, or a SQL Update statement.

Step 1100 determines, based on a condition, whether data in the row modified by the SQL row modification statement is visible or invisible to the SQL Select statement.

Condition 1150 is a condition under which the modified row is visible to the SQL Select statement. Condition 1150 is that the SQL row modification statement is a SQL Insert statement and a timestamp of the SQL row modification statement is not later than a timestamp of the SQL Select statement and a Commit has been executed for the SQL row modification statement.

Conditions 1110, 1120 and 1130 are conditions under which the modified row is invisible to the SQL Select statement.

Condition 1110 is a condition under which the SQL row modification statement is a SQL Delete statement and a timestamp of the SQL row modification statement is not later than a timestamp of the SQL Select statement and a Commit has been executed for the SQL row modification statement.

Condition 1120 is a condition under which a timestamp of the SQL row modification statement is later than a timestamp of the SQL Select statement.

Condition 1130 is a condition under which a timestamp of the SQL row modification statement is not later than a timestamp of the SQL Select statement and a Commit has not been executed for the SQL row modification statement.

Figure 12:
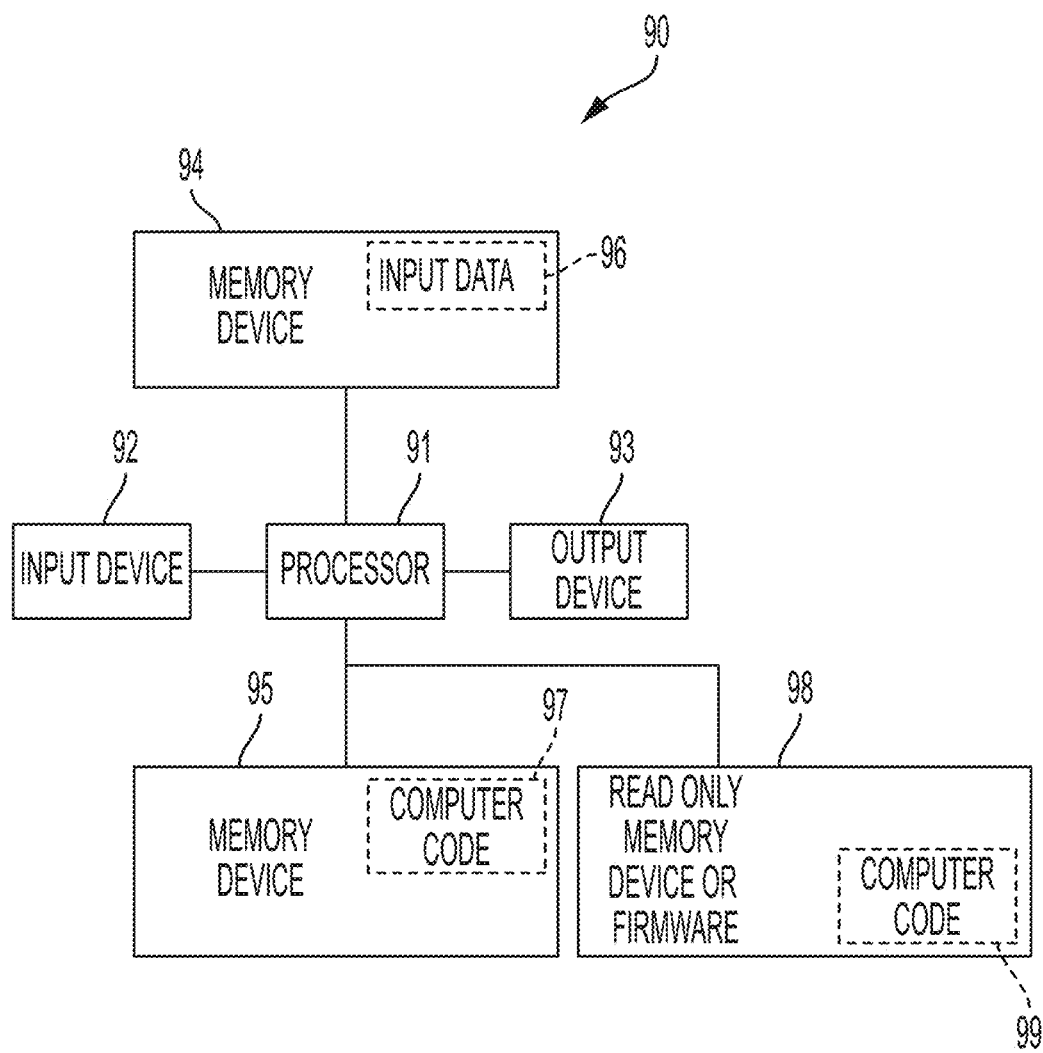
FIG. 12 illustrates a computer system, in accordance with embodiments of the present invention.

FIG. 12 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 98 (e.g., including algorithms) may be stored on a static, nonremovable, read-only storage medium such as a Read-Only Memory (ROM) device 99, or may be accessed by processor 91 directly from such a static, nonremovable, read-only medium 99. Similarly, in some embodiments, stored computer program code 97 may be stored as computer-readable firmware 99, or may be accessed by processor 91 directly from such firmware 99, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 12 shows the computer system 90 as a particular configuration of hardware and software, any configuration of hardware and software, as would be known to a person of ordinary skill in the art, may be utilized for the purposes stated supra in conjunction with the particular computer system 90 of FIG. 12. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
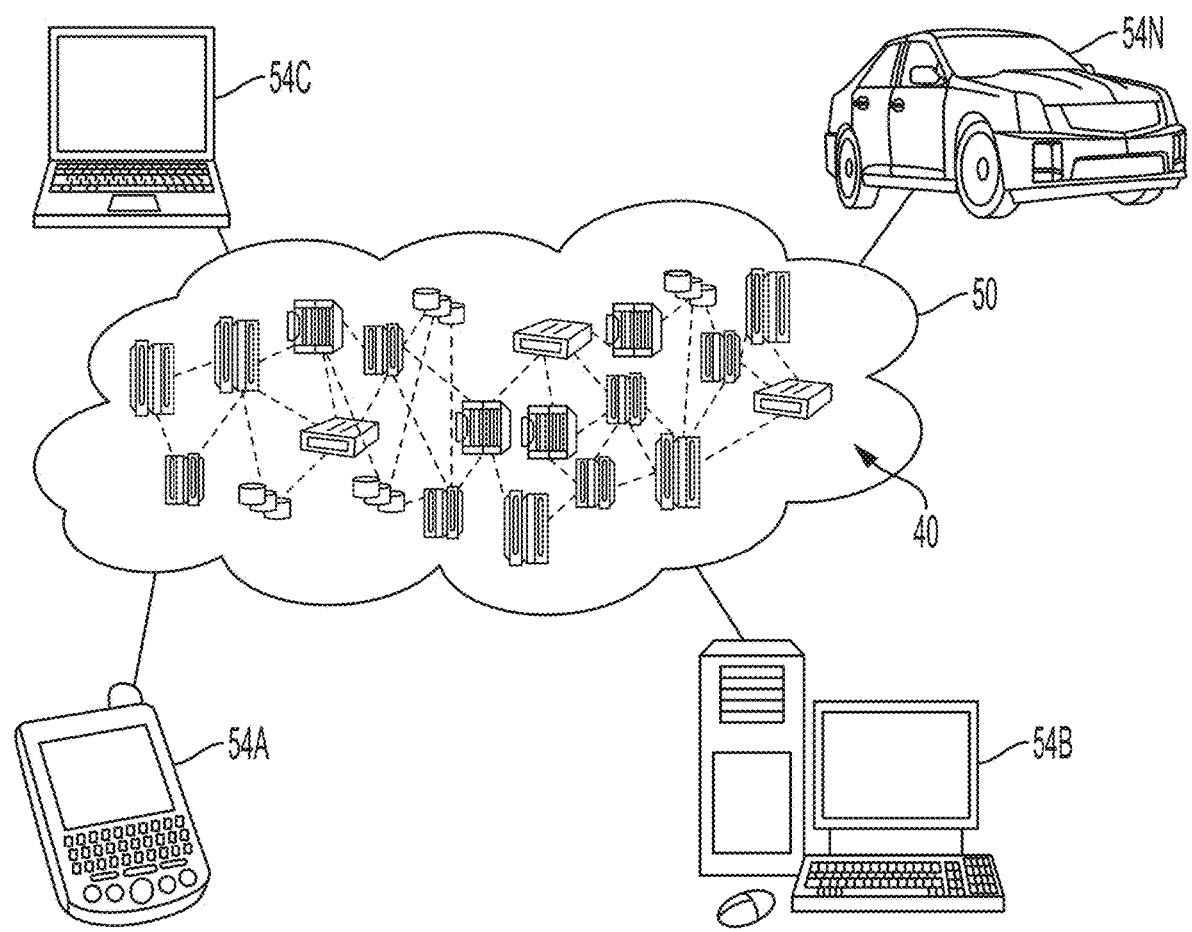
FIG. 13 depicts a cloud computing environment, in accordance with embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
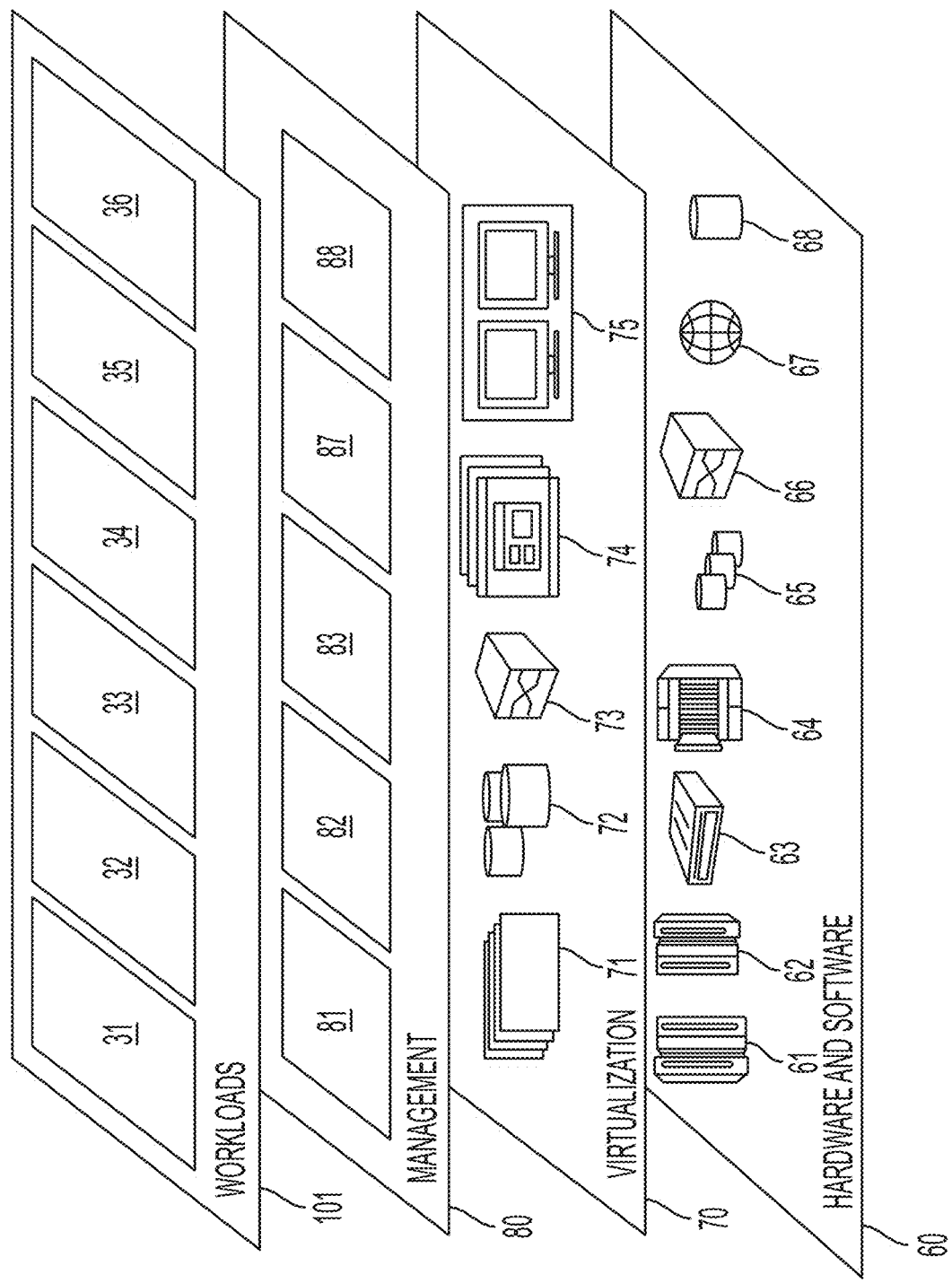
FIG. 14 depicts abstraction model layers, in accordance with embodiments of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 30 provides examples of functionality for which the cloud computing environment may be utilized. Examples of workloads and functions which may be provided from this layer include: mapping and navigation 31; software development and lifecycle management 32; virtual classroom education delivery 33; data analytics processing 34; transaction processing 35; and improving performance of a SQL execution sequence of SQL statements in a production database instance 36.

Examples and embodiments of the present invention described herein have been presented for illustrative purposes and should not be construed to be exhaustive. While embodiments of the present invention have been described herein for purposes of illustration, many modifications and changes will become apparent to those skilled in the art. The description of the present invention herein explains the principles underlying these examples and embodiments, in order to illustrate practical applications and technical improvements of the present invention over known technologies, computer systems, and/or products.

What is claimed is:

1. A method for improving performance of a Structured Query Language (SQL) execution sequence of SQL statements in a production database instance, said method comprising:
   recording, by one or more processors of a computer system, in an event log, the SQL execution sequence;
   recording, by the one or more processors, in a logical log in the production database instance, original results of executing the SQL statements in accordance with an original access path and an original Central Processing Unit (CPU) cost of executing the SQL statements in accordance with the original access path;
   generating, by the one or more processors, a modified database instance by applying a patch to the SQL execution sequence, wherein said generating the modified database instance includes generating a new access path from analysis of the event log and the logical log;
   executing, by the one or more processors, the SQL statements in accordance with the new access path resulting in new results of executing the SQL statements in accordance with the new access path;
   determining, by the one or more processors, a new CPU cost of executing the SQL statements in accordance with the new access path; and
   in response to a determination that the new results replicate the original results and that the new CPU cost is less than the original CPU cost, replacing, by the one or more processors, the original access path with the new access path in the production database instance for use in subsequent executions of the SQL statements,
   wherein the event log and the logical log are stored in a data storage cluster of the computer system.

2. The method of claim 1, wherein the SQL execution sequence comprises a plurality of time-ordered Unit Recovery (UR) lists, wherein each UR list comprises one or more SQL statements followed by a SQL Commit statement, and wherein each UR list has a unique identifier (ID) and a timestamp denoting a time at which the UR list is generated.

3. The method of claim 2, wherein the one or more SQL statements in one UR list of the UR lists includes a SQL row modification statement which is a SQL Insert statement, a SQL Delete statement, or a SQL Update statement, and wherein the method comprises ascertaining whether data in a row modified by the SQL row modification statement is visible or invisible to a SQL Select statement.

4. The method of claim 3, wherein the SQL row modification statement is a SQL Insert statement, and wherein said ascertaining ascertains that the data in the row modified by the SQL row modification statement is visible to the SQL Select statement in response to a determination that a timestamp of the SQL row modification statement is not later than a timestamp of the SQL Select statement and a Commit has been executed for the SQL row modification statement.

5. The method of claim 3, wherein the SQL row modification statement is a SQL Delete statement, and wherein said ascertaining ascertains that the data in the row modified by the SQL row modification statement is invisible to the SQL Select statement in response to a determination that a timestamp of the SQL row modification statement is not later than a timestamp of the SQL Select statement and a Commit has been executed for the SQL row modification statement.

6. The method of claim 3, wherein said ascertaining ascertains that the data in the row modified by the SQL row modification statement is invisible the SQL Select statement in response to a determination that a timestamp of the SQL row modification statement is later than a timestamp of the SQL Select statement.

7. The method of claim 3, wherein said ascertaining ascertains that the data in the row modified by the SQL row modification statement is invisible the SQL Select statement in response to a determination that a timestamp of the SQL row modification statement is not later than a timestamp of the SQL Select statement and a Commit has not been executed for the SQL row modification statement.

8. The method of claim 3, said method further comprising:
   tracing back, by the one or more processors, Undo records in the UR lists in accordance with a chain of Undo log addresses in respective UR lists of the plurality of time-ordered UR lists for respective changes to a column of a table, until a UR identifier (ID) of one of the respective UR lists is less than a lower boundary of active UR identifiers; and
   after said tracing back, determining, by the one or more processors, visibility of the changes to the column of the table based on a timestamp of a current SQL Select statement.

9. The method of claim 1, wherein the original CPU cost and the new CPU cost each is a total number of executed SQL statements in the SQL execution sequence.

10. The method of claim 1, wherein the original CPU cost and the new CPU cost each is a CPU execution time for executing the SQL statements in the SQL execution sequence.

11. A computer program product, comprising one or more computer readable hardware storage devices having computer readable program code stored therein, said program code containing instructions executable by one or more processors of a computer system to implement a method for improving performance of a Structured Query Language (SQL) execution sequence of SQL statements in a production database instance, said method comprising:

recording, by the one or more processors, in an event log, the SQL execution sequence;

recording, by the one or more processors, in a logical log in the production database instance, original results of executing the SQL statements in accordance with an original access path and an original Central Processing Unit (CPU) cost of executing the SQL statements in accordance with the original access path;

generating, by the one or more processors, a modified database instance by applying a patch to the SQL execution sequence, wherein said generating the modified database instance includes generating a new access path from analysis of the event log and the logical log;

executing, by the one or more processors, the SQL statements in accordance with the new access path resulting in new results of executing the SQL statements in accordance with the new access path;

determining, by the one or more processors, a new CPU cost of executing the SQL statements in accordance with the new access path; and in response to a determination that the new results replicate the original results and that the new CPU cost is less than the original CPU cost, replacing, by the one or more processors, the original access path with the new access path in the production database instance for use in subsequent executions of the SQL statements, wherein the event log and the logical log are stored in a data storage cluster of the computer system.

12. The computer program product of claim 11, wherein the SQL execution sequence comprises a plurality of time-ordered Unit Recovery (UR) lists, wherein each UR list comprises one or more SQL statements followed by a SQL Commit statement, and wherein each UR list has a unique identifier (ID) and a timestamp denoting a time at which the UR list is generated.

13. The computer program product of claim 12, wherein the one or more SQL statements in one UR list of the UR lists includes a SQL row modification statement which is a SQL Insert statement, a SQL Delete statement, or a SQL Update statement, and wherein the method comprises ascertaining whether data in a row modified by the SQL row modification statement is visible or invisible to a SQL Select statement.

14. The computer program product of claim 13, wherein the SQL row modification statement is a SQL Insert statement, and wherein said ascertaining ascertains that the data in the row modified by the SQL row modification statement is visible to the SQL Select statement in response to a determination that a timestamp of the SQL row modification statement is not later than a timestamp of the SQL Select statement and a Commit has been executed for the SQL row modification statement.

15. The computer program product of claim 13, wherein the SQL row modification statement is a SQL Delete statement, and wherein said ascertaining ascertains that the data in the row modified by the SQL row modification statement is invisible to the SQL Select statement in response to a determination that a timestamp of the SQL row modification statement is not later than a timestamp of the SQL Select statement and a Commit has been executed for the SQL row modification statement.

16. A computer system, comprising one or more processors, one or more memories, and one or more computer readable hardware storage devices, said one or more hardware storage devices containing program code executable by the one or more processors via the one or more memories to implement a method for improving performance of a Structured Query Language (SQL) execution sequence of SQL statements in a production database instance, said method comprising:

recording, by the one or more processors, in an event log, the SQL execution sequence;

recording, by the one or more processors, in a logical log in the production database instance, original results of executing the SQL statements in accordance with an original access path and an original Central Processing Unit (CPU) cost of executing the SQL statements in accordance with the original access path;

generating, by the one or more processors, a modified database instance by applying a patch to the SQL execution sequence, wherein said generating the modified database instance includes generating a new access path from analysis of the event log and the logical log;

executing, by the one or more processors, the SQL statements in accordance with the new access path resulting in new results of executing the SQL statements in accordance with the new access path;

determining, by the one or more processors, a new CPU cost of executing the SQL statements in accordance with the new access path; and in response to a determination that the new results replicate the original results and that the new CPU cost is less than the original CPU cost, replacing, by the one or more processors, the original access path with the new access path in the production database instance for use in subsequent executions of the SQL statements, wherein the event log and the logical log are stored in a data storage cluster of the computer system.

17. The computer system of claim 16, wherein the SQL execution sequence comprises a plurality of time-ordered Unit Recovery (UR) lists, wherein each UR list comprises one or more SQL statements followed by a SQL Commit statement, and wherein each UR list has a unique identifier (ID) and a timestamp denoting a time at which the UR list is generated.

18. The computer system of claim 17, wherein the one or more SQL statements in one UR list of the UR lists includes a SQL row modification statement which is a SQL Insert statement, a SQL Delete statement, or a SQL Update statement, and wherein the method comprises ascertaining whether data in a row modified by the SQL row modification statement is visible or invisible to a SQL Select statement.

19. The computer system of claim 17, wherein said ascertaining ascertains that the data in the row modified by the SQL row modification statement is invisible the SQL Select statement in response to a determination that a timestamp of the SQL row modification statement is later than a timestamp of the SQL Select statement.

20. The computer system of claim 17, wherein said ascertaining ascertains that the data in the row modified by the SQL row modification statement is invisible the SQL Select statement in response to a determination that a timestamp of the SQL row modification statement is not later than a timestamp of the SQL Select statement and a Commit has not been executed for the SQL row modification statement.

* * * * *